(12) United States Patent
Chotard et al.

(10) Patent No.: US 7,472,255 B2
(45) Date of Patent: Dec. 30, 2008

(54) METHOD FOR ADDRESSING A SYMBOL IN A MEMORY AND DEVICE FOR PROCESSING SYMBOLS

(75) Inventors: Ludovic Chotard, Grenoble (FR); José Sanches, Meylan (FR)

(73) Assignee: STMicroelectronics S.A., Paris (FR)

( * ) Notice: Subject to any disclaimer, the term of this patent is extended or adjusted under 35 U.S.C. 154(b) by 183 days.

(21) Appl. No.: 11/392,466

(22) Filed: Mar. 29, 2006

(65) Prior Publication Data

US 2006/0236021 A1 Oct. 19, 2006

(30) Foreign Application Priority Data

Apr. 1, 2005 (FR) .................................. 05 03242

(51) Int. Cl.
*G06F 12/00* (2006.01)
(52) U.S. Cl. .......................................... 711/220; 711/5
(58) Field of Classification Search ...................... 711/5, 711/220
See application file for complete search history.

(56) References Cited

U.S. PATENT DOCUMENTS 4,833,657 A * 5/1989 Tanaka .................. 365/230.04
5,101,343 A    3/1992 Yokouchi
2003/0126399 A1 7/2003 Troutman et al.
2003/0126402 A1 7/2003 Okano et al.

FOREIGN PATENT DOCUMENTS

EP    0849709    6/1998

OTHER PUBLICATIONS

IBM Technical Disclosure Bulletin: "Method for Handling Unaligned Operanda That Extend Across Memory Protection Boundaries in a Microprocessor"; Apr. 1994; pp. 597-598; vol. 37, No. 04B; Armonk, NY, US.
French Search Report FR 0503242; Nov. 2, 2006.

* cited by examiner

*Primary Examiner*—Reginald G Bragdon
*Assistant Examiner*—Aracelis Ruiz
(74) *Attorney, Agent, or Firm*—Hogan & Hartson LLP (57) ABSTRACT

A bitwise addressing mode includes including the shaping of symbols of variable length during an operation for reading or writing a symbol in a bank of memories. The addressing is then done with the aid of a word address and of a bit pointer designating the start of the symbol in the word corresponding to the word address. A shift operation is performed during an operation of reading or of writing.

20 Claims, 5 Drawing Sheets

METHOD FOR ADDRESSING A SYMBOL IN A MEMORY AND DEVICE FOR PROCESSING SYMBOLS

RELATED APPLICATION

The present application claims priority of French Patent Application No. 05 03242 filed Apr. 1, 2005, which is incorporated herein in its entirety by this reference.

FIELD OF THE INVENTION

The invention relates to data storage in integrated circuit memories and, more particularly, to processing devices performing, in such memories, operations for reading and writing symbols which correspond to binary words of variable length.

BACKGROUND OF THE INVENTION

In the field of data compression, there exist techniques implementing variable-length compression codes, such as, for example, Huffman codes. These variable-length codes are well known to the person skilled in the art and widely used in the field of data storage and transmission. By way of example, such codes are used in combination with others in compression standards such as MPEG2 or MPEG4, for digital video broadcasting.

The principle of a variable-length compression code comprises replacing binary words of fixed length by binary symbols of variable length. For a data packet to be compressed, a statistical study makes it possible to ascertain for each fixed length word its probability of occurrence in the packet. A correspondence table is thereafter created so as to match each fixed length word up with a corresponding variable length symbol. A word having a high probability of occurrence is coded on a symbol of small size while a word having a low probability of occurrence is coded on a bigger size symbol.

Figure 1:
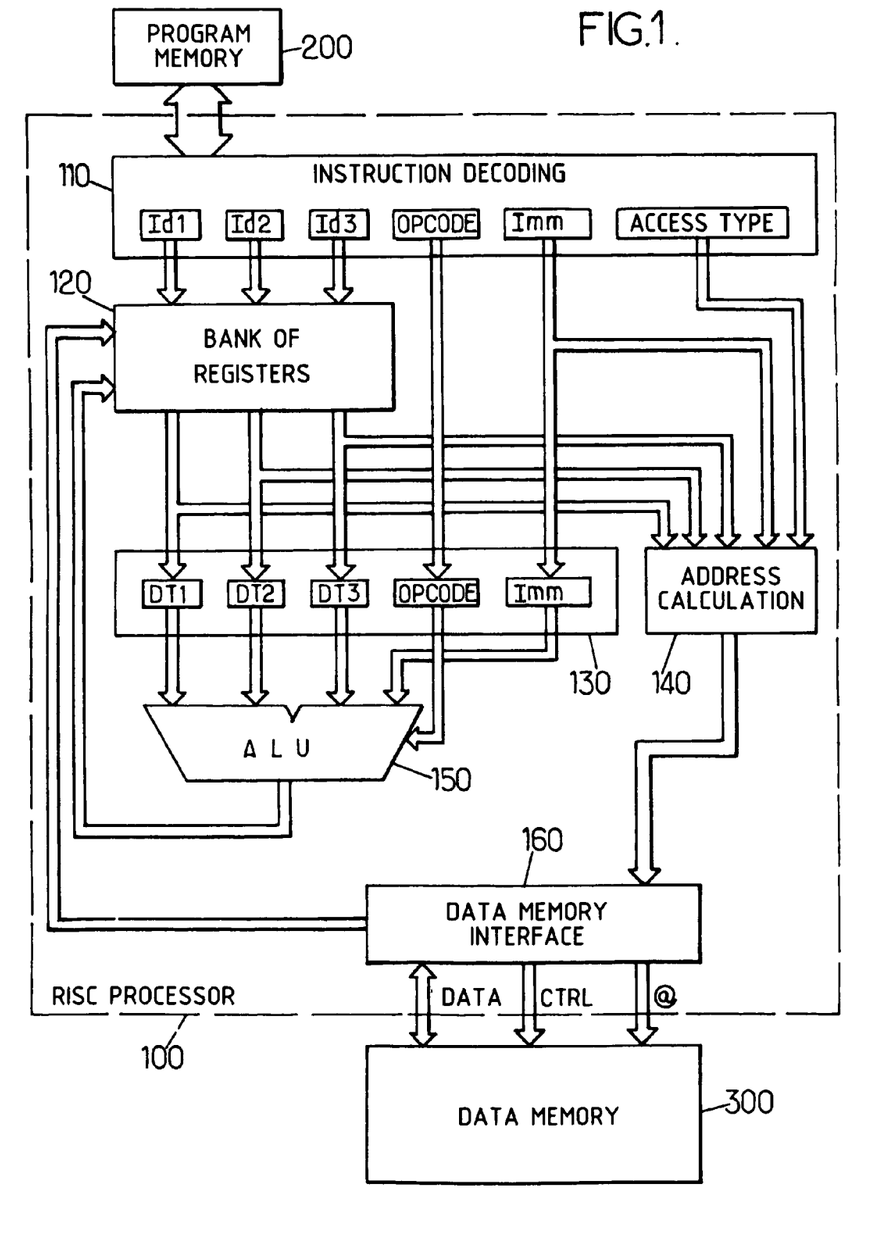
FIG. 1 represents an exemplary processing device according to the state of the art.

Compressed data encoding with the aid of a variable length code is conventionally done with a processing device using a processor. FIG. 1 represents a known example of a processing device comprising a processor 100 of RISC type coupled to a programme memory 200 and to a data memory 300. The processor 100 mainly includes an instruction decoding circuit 110, a bank of registers 120, buffer registers 130, an address calculation circuit 140, an arithmetic and logic unit (ALU) and a data memory interface 160. This microprocessor 100 is of "pipeline" type, that is to say an instruction is processed in several clock cycles. In the example described, a first clock cycle serves to decode the instruction and to load the buffer registers 130, and a second cycle serves to perform the operation corresponding to the instruction. By exception, however, a data write can be performed in a single clock cycle.

As is known to the person skilled in the art, processors use words of fixed size to perform operations, for example words of m bits where m is a determined positive integer. When data are compressed in the form of symbols of variable size, the symbols are concatenated into words of m bits so as to be stored in the data memory 300.

Figure 2:
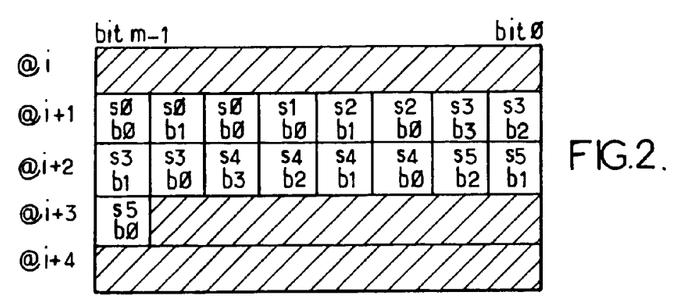
FIG. 2 shows an exemplary memory plane for symbols stored in a memory according to the state of the art.

FIG. 2 shows an exemplary memory plane of a data memory organized as words of m bits, for the storage of symbols. By way of example, five symbols $S_0$ to $S_5$ are stored on (2×m)+1 bits belonging to three memory words of consecutive addresses (i+1) to (i+3) respectively.

To be able to retranscribe the bits of a symbol read from the memory into a single word of m bits, the processor should ideally read the word or words of m bits containing the bits of the symbol then perform a bit masking operation so as to conserve only the bits of the symbol, and thereafter a bit shift operation so as to set the bits of the symbol either to low-order bits, or to high-order bits in a word of m bits. If the symbol is written in tandem on two words of the memory, as is the case for example for the symbol $S_3$, two read operations, two masking operations and two shift operations are necessary as well as a logic operation of OR type to obtain the symbol without the form of a single word. It is only thereafter that the symbol can be decoded to obtain the corresponding decoded word.

The storage (writing) of a symbol in the memory also necessitates a certain number of operations, a symbol having to be shifted so as to arrive next to the previous symbol before being added by an operation of OR type. It is only then that the write can take place. If the shifted symbol is distributed over two words, additional masking operations are necessary.

Thus the reading or the writing of a symbol may necessitate three to seven elementary operations. In the case of a "pipeline" processor using two clock cycles per operation, four to eight clock cycles are necessary with interlaced operations.

The reading or the writing of a symbol therefore necessitate a non-negligible processing time for a processor dedicated to variable-length compression coding/decoding. Now, in a video stream broadcasting chain, the number of symbols transmitted per second is very high (several million symbols per second). This is why solutions are sought for reducing the processing time related to the reading or to the writing of a variable size symbol in a memory.

A solution is proposed in the document EP-A-0 849 709. This solution comprises supplementing the arithmetic and logic unit of a processor with means for supporting operations dedicated to the shaping of symbols. Three specific operations are proposed making it possible to reduce the reading or the writing of a symbol to a number of elementary operations of between three and six. In the case of a "pipeline" processor using two clock cycles per operation, only four to seven clock cycles are then necessary with interlaced operations.

SUMMARY OF THE INVENTION

The aim of the invention is to propose another solution for reducing the number of clock cycles necessary for performing operations for reading or writing symbols of variable size. This aim is achieved by virtue of a bitwise addressing mode which includes the shaping of the symbols in the processing of the operations for reading or writing a symbol. The addressing is then done with the aid of a word address and of a bit pointer designating the start of the symbol in the word corresponding to the address. Moreover, a shift operation is performed during an operation of reading or of writing.

According to a first aspect, the invention proposes a method of addressing for performing an operation for reading or writing a symbol of k bits in a bank of memories linked to a processor by a data bus of p bits. The bank of memories is organized as words of p bits and employs word-based addressing, p being a positive integer greater than 4, and k being an integer lying between 1 and p. The addressing of a symbol is done with the aid of a word address designating a determined word of p bits which contains a first bit of the symbol, in combination with a bit pointer designating the first bit of the symbol in the word of p bits designated by the word address. A shift of bits is moreover performed during an operation of reading or of writing, as a function of the value of the bit pointer, on the word of p bits read or written.

According to an embodiment, the bank of memories includes n memories organized as words of m bits each, m and n being two integers greater than or equal to two and such that n×m=p, so that the juxtaposition of n words of m bits originating from each of the memories forms a word of p bits. The value k being less than or equal to ((n−1)×m)+1, at least one of the memories of the bank is selected by the word address and at least one other memory of the bank is simultaneously selected by the word address incremented by an address unit.

In the case of an operation of writing, and when a bitwise write validation for the word of p bits to be written in the bank of memories is envisaged, only the k bits corresponding to the symbol to be written after shifting are validated for the write. In a preferred manner, the shift of bits is a shift bringing the symbol into a contiguous position, with respect to a position of another symbol in the bank of memories.

In the case of an operation of reading, the shift of bits brings the symbol to the low-order end or to the high-order end in the word of p bits, and a masking thereafter sets to zero the bits of the word of p bits not belonging to the symbol.

The addition of a reduced number of elements is necessary for performing the various operations.

According to a second aspect, the invention proposes a processing device for symbols of k bits including a bank of memories and a processor linked together by at least one data bus of p bits, p being an integer greater than or equal to 4, and k being an integer lying between 1 and p. The bank of memories is organized as words of p bits and employs word-based addressing. The processor includes means of storage and means of shifting of bits. The means of storage are able to store a word address and a bit pointer. This word address designates a word of p bits containing a first bit of a symbol to be read or to be written. The bit pointer designates the first bit of the symbol in the word of p bits designated by the word address. The means of shifting are able to perform, during an operation of reading or of writing, a shift of bits on the word of p bits read or written, as a function of the value of the bit pointer.

Preferably, the means of storage include a first register able to store the word address in the guise of high-order bits and the bit pointer in the guise of low-order bits.

In an embodiment, the processor includes at least one second register for storing the value of k.

In an embodiment, the bank of memories includes n memories ($Mem_0$ to $Mem_{n-1}$) of m bits each, n and m being two integers greater than two and such that p=n×m, each memory being addressable individually. The processor includes means of address incrementation and means of selection. The means of address incrementation are adapted so as to produce an incremented address corresponding to the word address incremented by an address unit. The means of selection are adopted for selecting the word address or the incremented address to be provided as input to the bank of memories.

For the operations of reading, the processor can include means of masking for setting to zero p−k bits of a word of p bits read from the bank of memories which do not correspond to the symbol of k bits.

In an embodiment, the processor includes data inputs intended to be coupled to the data bus, at least one data register, and an arithmetic and logic unit. The data register is able to receive a symbol read from the bank of memories. The arithmetic and logic unit is able to perform various operations on data present on the data inputs in response to an operation code. The arithmetic and logic unit includes the means of shifting and the aforesaid means of masking, and is placed on a data path between the data inputs and the data register.

For the operations of writing, and when the bank of memories employs a functionality for validating writing performed bitwise with the aid of a validation word of p bits, the processor includes means of generation of a word for validating writing so as to provide an adapted validation word for validating the writing solely of the bits corresponding to the symbol to be written in the bank of memories.

BRIEF DESCRIPTION OF THE DRAWINGS

The invention will be better understood and other features and advantages will appear on reading the description which follows, the description referring to the appended figures among which.

DETAILED DESCRIPTION

The invention proposes a novel mode of addressing in which the address of a symbol comprises a word address of p bits and a bit pointer indicating the position of the first bit of the symbol in the memory word designated by this address. The symbol is shifted during an operation of reading or of writing so as to reduce the number of operations to be executed by a processor processing the symbol. The use of a conventional memory with such a mode of addressing makes it possible to recover directly a symbol of k bits with $k \leq p$ and to shift it at the same time if the whole symbol is contained in a single word of p bits. Such an implementation makes it possible to reduce the number of instructions necessary for transferring a symbol between the processor and the memory but solely when the symbol is contained in a single memory word.

The embodiment which will now be described makes it possible to apply the mode of addressing of the invention independently of the distribution of the symbol in one or more successive memory words of p bits (by considering an order related to the plane of addressing of the memory words). The example described implements a memory organized as a bank of memories with word-based addressing so as to be able to be used equally well when a symbol is stored in a word of p bits at a given address or when a symbol is stored in two successive words of p bits.

Figure 3:
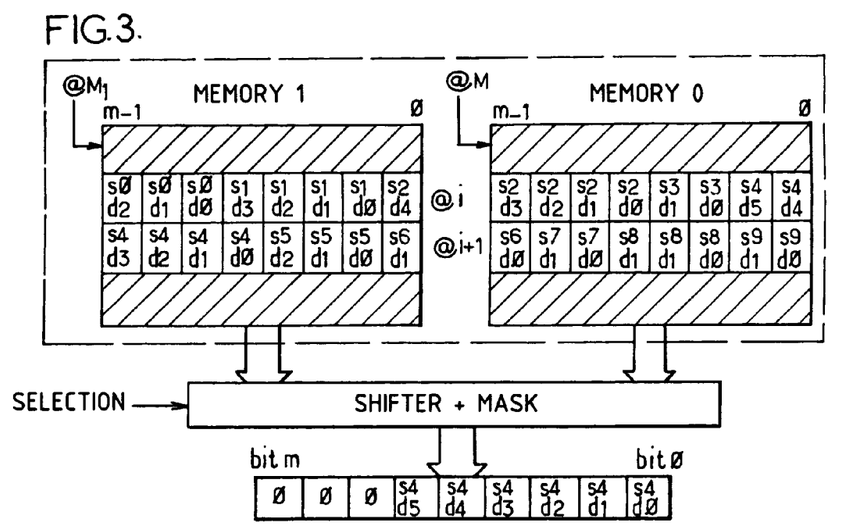
FIGS. 3 and 4 show two examples of organization of a bank of memories according to the invention.

FIG. 3 represents a bank of memories 300b including two memories $Mem_0$ and $Mem_1$ organized as words of m bits. The two words of m bits here constitute a word of p bits with p=2×m. For an operation according to a conventional addressing mode (direct, indirect or indexed addressing) the two memories receive the same address and the two words of m bit are juxtaposed so as to form a word of p bits. According to the mode of addressing of the invention, each memory receives an address, respectively @$M_0$ and @$M_1$, which is specific to it. Thus, even if a symbol is distributed between two words of p bits, for example the symbol S4, it is possible to access in a single addressing operation all the bits of the symbol by addressing the word of m bits of the memory $Mem_1$ situated at the address @i and the word of m bits of the memory Memo situated at the following address @i+1. A shift and masking circuit Dec placed in the processor performs the shift of the bits of the symbol and sets to 0 the other bits of the word of p bits read. Thus a single operation is necessary for the reading of the symbol S4.

Such a mode of addressing is advantageous but is however limited. The symbols should ideally be contained in two words of m bits contained respectively in each of the two memories. When the symbols are greater than m+1 bits in size, the symbols can be distributed on three words of m bits and it is then necessary to perform two reads together with concatenation operations.

In the case where the processor has an architecture of p bits, the symbols are generally less than p bits in size. It is possible to modify the process so as to locally incorporate a bus and a shifter of 2p bits so as to link the data buses of two memories of p bits. However such a solution is expensive in terms of space and in terms of consumption. For these reasons, memories the union of whose buses is of p bits, are preferred.

Figure 4:
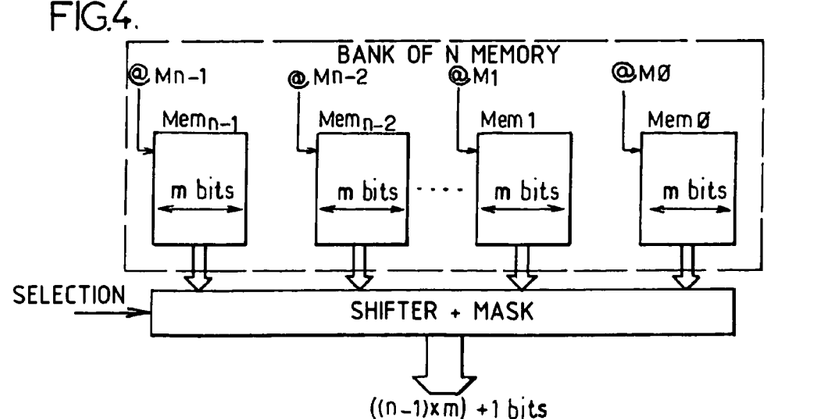

FIG. 4 shows a generalization of bank 300b of memories which includes n memories $Mem_0$ to $Mem_{n-1}$ organized as words of m bits, and together forming a word of p bits with p=n×m. The principle is the same as that described above with reference to FIG. 3. Here, the symbols which may pose a read problem are solely the symbols of size greater than ((n−1)×m)+1 bits. Thus, it is possible to consider that any symbol of at most ((n−1)×m)+1 bits is read and shaped in a single operation. A single operation suffices also to shape and write a symbol of at most ((n−1)×m)+1 bits. For the symbols of greater size, one operation may suffice but solely if the symbol is stored in n words of m bits.

In the case of a processor intended to implement a variable length coding, for example within the MPEG2 or MPEG4 framework, the maximum number of bits of a symbol is less than or equal to 24 bits. Thus with n=4, m=8 and p=32, all the symbol read and write operations can be performed in a single elementary operation.

Figure 5:
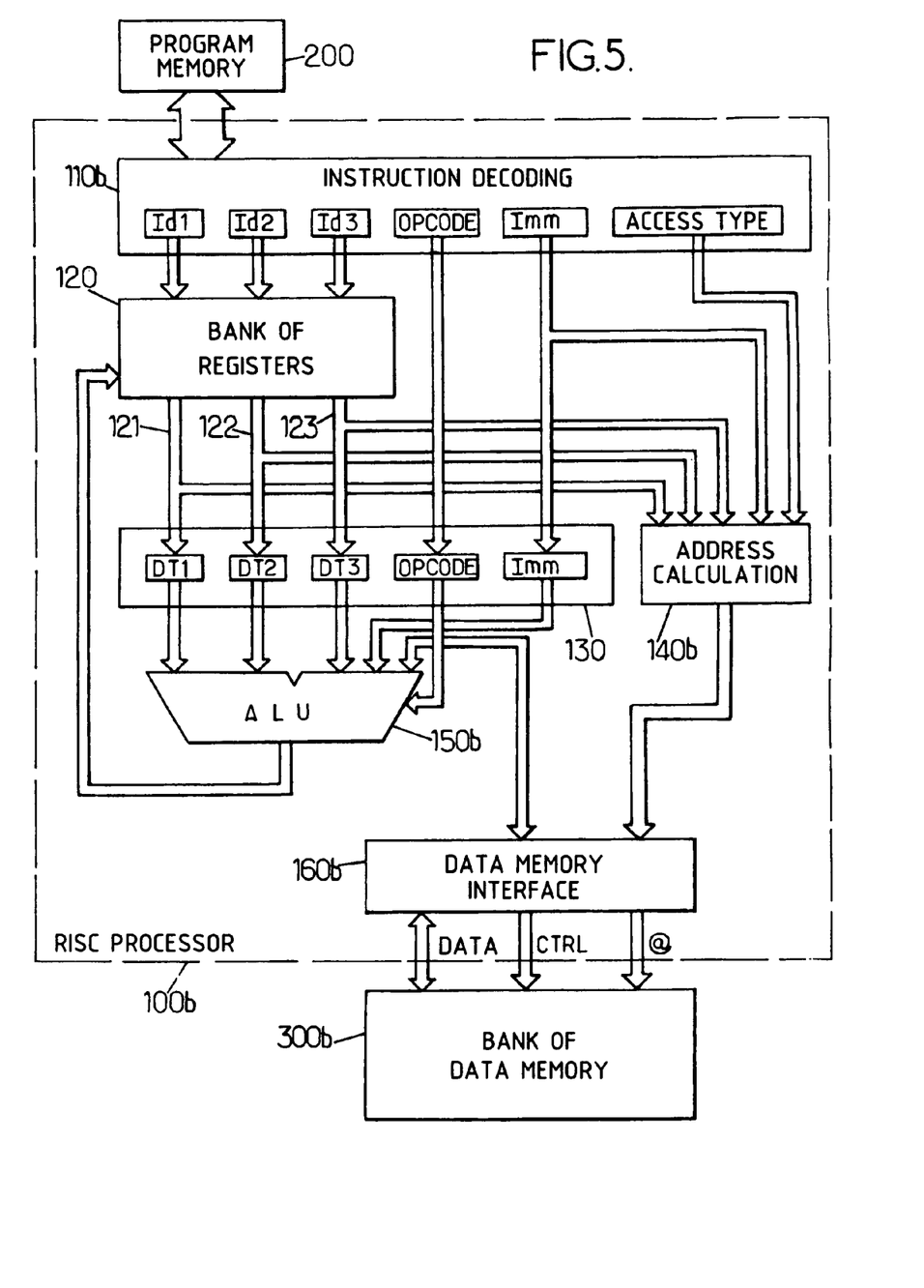
FIG. 5 represents an exemplary embodiment of a processing device according to the invention.

FIG. 5 represents an exemplary processing system according to the invention, which includes a processor 100b of RISC type coupled to a programme memory 200 and to a data memory 300b. The processor 100b mainly includes an instruction decoding circuit 110b, a bank of registers 120, buffer registers 130, an address calculation circuit 140b, an arithmetic and logic unit (ALU) 150b and a data memory interface 160b. The references ending with the letter b indicate that the elements are slightly modified with respect to the state of the art, so as to allow the implementation of the invention.

The processor 100b differs from those known in the state of the art by a data path going from the interface 160b to the bank of registers 120, crossing the ALU 150b. For a data read operation according to a conventional addressing mode, the ALU is configured to steer the datum originating from the interface 160b to its output without modifying it.

The instruction decoding circuit 110b corresponds to an instruction decoding circuit of the state of the art which moreover makes it possible to decode instructions for reading and writing symbols of variable size. When an instruction is decoded, output registers are set as a function of the instruction. Registers Id1 to Id3 provide register addresses to the bank of registers 120 so as to place the content of the registers addressed on data buses 121 to 123. The bank of registers 120 comprises for example sixteen registers addressable with the aid of multiplexers, each register address thus including four bits, each register being a register of p bits that is able to receive data and also addresses. A register OpCode makes it possible to indicate the operating configuration of the ALU 150b during the following clock cycle. This register contains the operating code of the instruction to be executed. A register Imm serves for a mode termed immediate which specifies in the instruction an address value or a constant. This register is not used in the implementation of the operations of reading and of writing which are the subject of the invention. A register AccesType indicates a mode of operation to the address calculation circuit 140b. The register AccesType indicates that an access to the memory is requested, whether it involves a read or a write, and the addressing mode used. As a function of the content of the register AccesType, the address calculation circuit adopts an appropriate circuit configuration. The various configurations of the address calculation circuit 140b and of the ALU 150b are obtained by multiplexing techniques known to the person skilled in the art.

To show the modifications to be made to the various circuits, it is apposite to detail the configuration adopted by the microprocessor during the operations for reading and writing a symbol.

Figure 6:
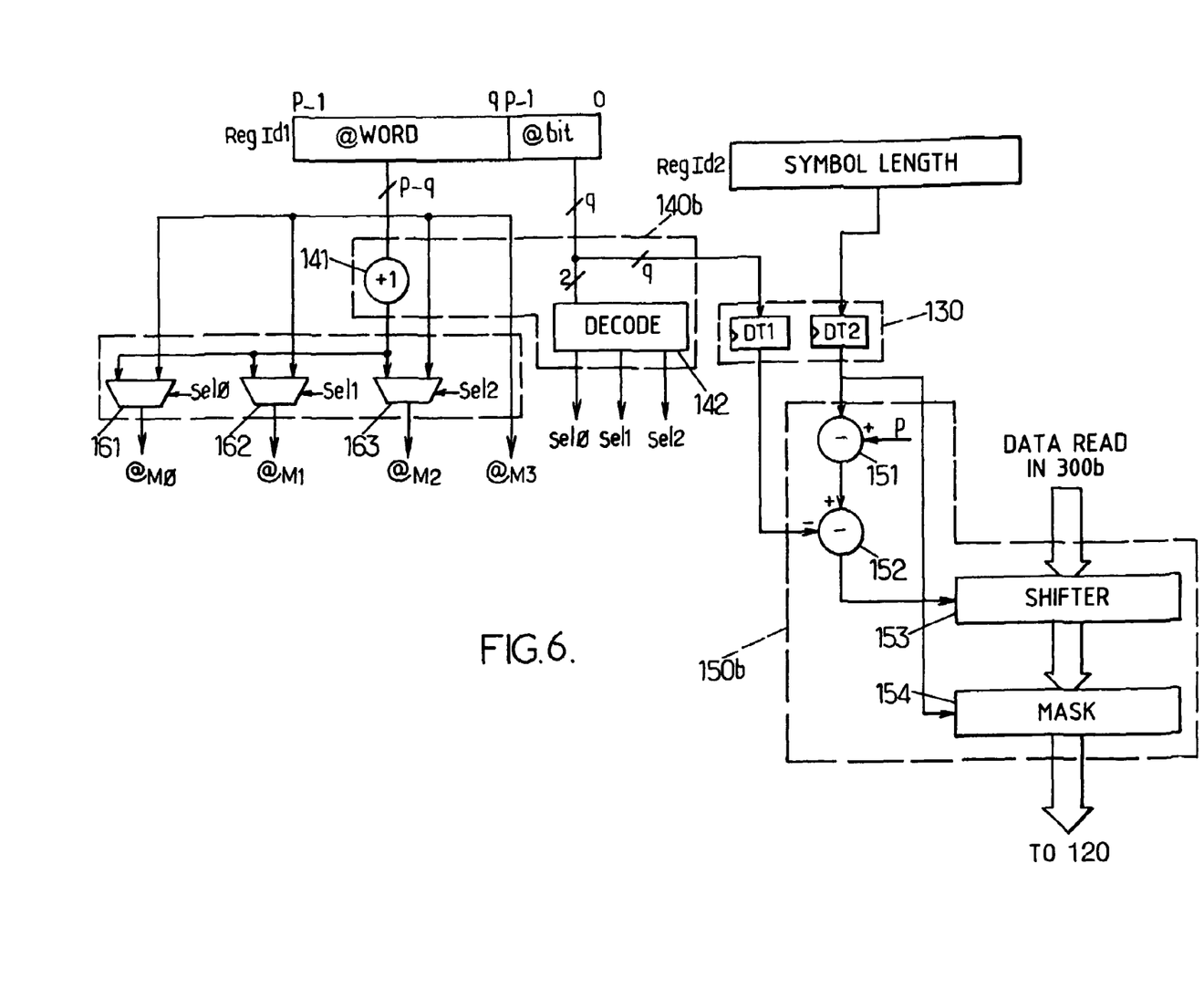
FIG. 6 represents an exemplary configuration of a processor for an operation of reading according to the invention.

FIG. 6 shows an exemplary configuration of the processor 100b during an operation for reading a symbol.

When a symbol read instruction is decoded, the decoding circuit 110b sets the register Id1 to the address of a register of the bank of registers 120 corresponding to the read address of the symbol. The content of this register of the bank 120, denoted RegId1, then appears on the bus 121 and can be provided to the buffer registers 130 and to the address calculation circuit 140b. The decoding circuit 110b sets the register Id2 to the address of a register of the bank of registers corresponding to a length of the symbol to be read. The content of this register of the bank 120, denoted RegId2, then appears on the bus 122 and can be provided to the buffer registers 130 and to the address calculation circuit 140b. The decoding circuit 110b sets the register OpCode so as to indicate the configuration of the ALU 150b for the next clock cycle. The content of the register OpCode crosses the buffer registers 130 before being provided to the ALU 150b for the following clock cycle. The decoding circuit 110b sets the register AccesType so as to indicate to the calculation circuit 140b that it should perform an operation for reading a symbol.

The bank of memories 300b includes n memories, denoted here $Mem_0$ to $Mem_3$, each organized as words of m bits. The data bus of the memory, as well as the buses and data registers of the processor 100b have a capacity of p bits. By way of example and for the remainder of the description, we consider that n=4, m=8 and p=32. The bank of memories 300b therefore has four address inputs for receiving the addresses @M0 to @M3.

The address of the symbol, provided by the register RegId1 comprises two parts. A first part, comprising the p−q high-order bits of the register Reg Id1, corresponds to the address of a word of p bits which contains the first bit of the symbol to be read. The first bit of the symbol corresponds for example to the highest-order bit of the symbol. A second part, comprising the q low-order bits of the register Reg Id1, corresponds to a bit pointer @bit which indicates the position of the first bit of the symbol in the word of p bits. By way of example, a pointer of value zero indicates that the first bit of the symbol is the highest-order bit of the word of p bits, and a pointer of value i indicates that the first bit of the symbol is the $(i+1)^{th}$ highest-order bit of the word of m bits. The value of q is chosen so that $2^q \geq p > 2^{q-1}$. For example q=5.

In the symbol read configuration, the address calculation circuit processes the content of the register RegId1 separately. The p−q high-order bits, corresponding to the word address @word, are provided to an address incrementation circuit 141, typically a fast adder which adds the value 1 so as to generate an incremented address. The word address @word and the incremented address are both provided to the interface 160b. The two high-order bits of the bit pointer @bit are provided to a decoder 142. The decoder 142 provides three selection signals Sel0 to Sel2 destined for the interface 160b.

The interface 160b employs four address buses for providing the addresses @M0 to @M3 to each of the memories $Mem_0$ to $Mem_3$. Now, as indicated previously, these addresses may correspond to two successive addresses of respective words of p bits. Thus the interface 160b employs 3 multiplexers 161 to 163 for providing an address to the memories $Mem_0$ to $Mem_2$ respectively. Each multiplexer 161 to 163 receives the two addresses provided by the address calculation circuit as well as one of the selection signals, respectively Sel0 to Sel2. The address provided to the memory $Mem_3$ corresponds again to the address of the word containing the first bit of the symbol to be read.

In an example, the two high-order bits of the bit pointer @bit indicate in which of the memories $Mem_0$ to $Mem_3$ the first bit of the symbol to be read is situated. The pair "00" as high-order bits thus indicates that this first bit is in the memory $Mem_0$ and that all the memories receive the address of the word containing the first bit of the symbol. If the pair is "01" then the first bit is in the memory $Mem_1$ and the memory $Mem_0$ receive the incremented address. If the pair is "10" then the first bit is in the memory $Mem_2$ and the memories $Mem_0$ and $Mem_1$ receive the incremented address. If the pair is "11" then the first bit is in the memory $Mem_3$ and the memories $Mem_0$ to $Mem_2$ receive the incremented address.

The command interface moreover has means for producing drive signals for controlling the memories $Mem_0$ to $Mem_3$. These means are not represented since they are identical to those used for the conventional addressing of a memory.

During a second clock cycle of the processing of the read instruction, the content of the register OpCode of the decoding circuit 110b and the contents of the registers RegId1 and RegId2 are transferred into the buffer registers 130, the registers OpCode, DT1 and DT2 respectively. During this second clock cycle, the datum read is provided by the bank of memories 300b and the interface 160b provides it to the ALU 150b. The ALU 150b is configured specifically by the content of the register OpCode for the reading of the symbol.

The register DT1 contains the address of the word of p bits and the bit pointer @bit. However, the configuration of the ALU 150b takes into account only the q low-order bits corresponding to the bit pointer @bit. The register DT2 contains a binary value k representative of the length of the symbol read. The ALU 150b performs a calculation of a shift value equal to p−k−@bit with the aid of subtraction circuits 151 and 152. The thus calculated shift value is positive or negative and it makes it possible to peg the symbol to the low-order end in a word of p bits. A barrel shifter 153, already present in the ALU 150b for another function, receives on the one hand the word of p bits provided by bank of memories 300b and on the other hand the shift value so as to perform the as calculated shift of bits, on the word read by looping the highest-order bit around the lowest-order bit, the shift being to the right if the shift value is positive, or to the left if the shift value is negative. The shifted word is thereafter provided to a masking circuit 154 which moreover receives the value k. The masking circuit is transparent for the k low-order bits and sets to zero the p−k high-order bits. The output of the masking circuit thus provides the symbol read which can be stored in the bank of registers 120.

Thus an operation for reading a symbol of k bits, with $k \leq ((n-1) \times m)+1$, is performed in two clock cycles. Moreover, the read operation includes the shifting and masking operation, so that the symbol read is set for the processing to be performed.

Figure 7:
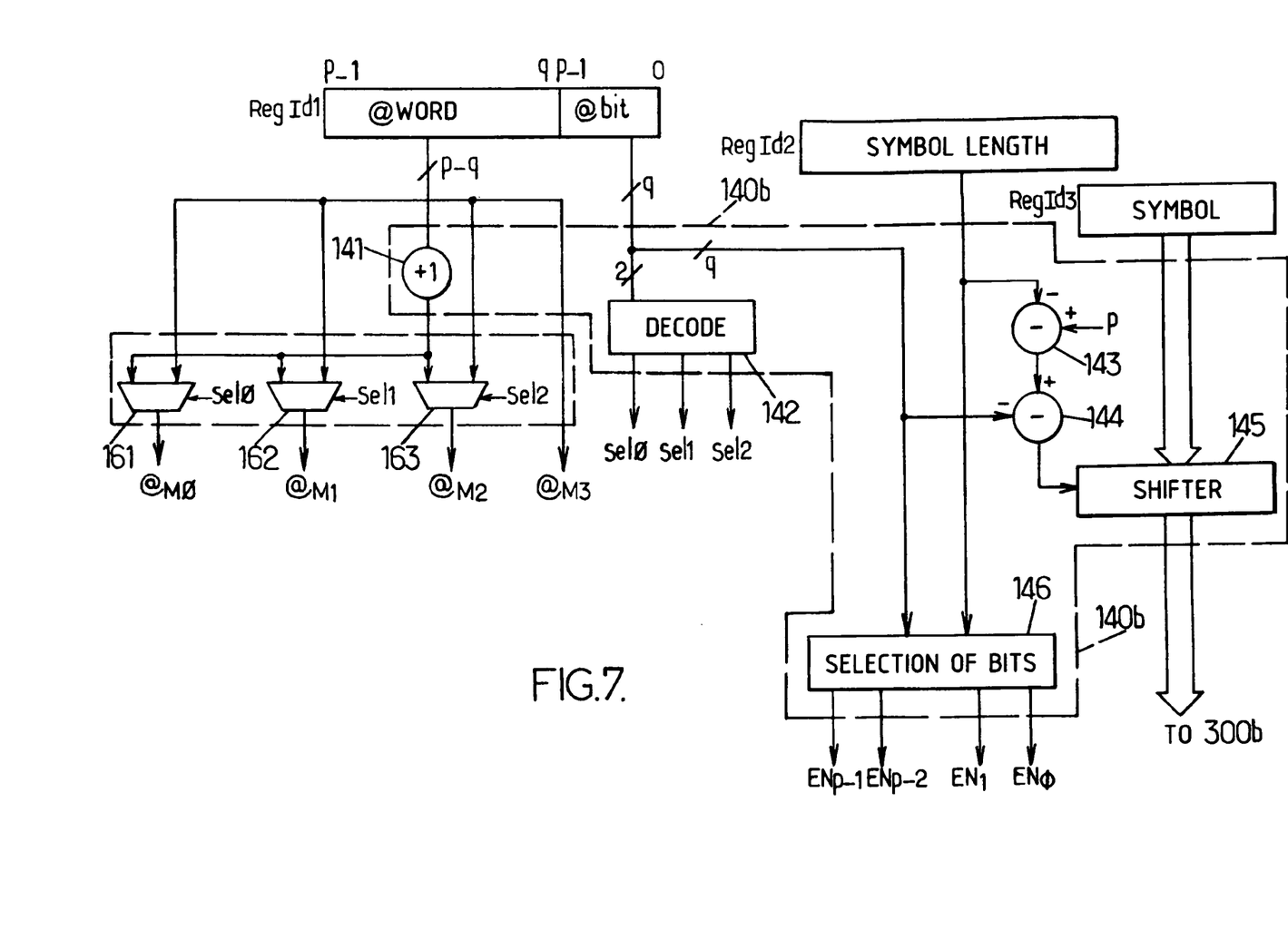
FIG. 7 represents an exemplary configuration of a processor for an operation of writing according to the invention.

FIG. 7 shows an exemplary configuration of the processor 100b during an operation for writing a symbol.

When a symbol write instruction is decoded, the decoding circuit 110b sets the register Id1 to the address of a register of the bank of registers 120 containing the write address of the symbol. The content of this register, denoted RegId1, then appears on the bus 121 and can be provided to the address calculation circuit 140b. The decoding circuit 110b sets the register Id2 to the address of a register of the bank of registers 120 containing a length of the symbol to be written. The content of this register denoted RegId2 then appears on the bus 122 and can be provided to the address calculation circuit 140b. The decoding circuit 110b sets the register Id3 to the address of a register of the bank of registers containing the symbol to be written in the memory. The content of this register denoted RegId3 then appears on the bus 123 and can be provided to the address calculation circuit 140b. The decoding circuit 110b sets the register AccesType so as to indicate to the calculation circuit 140b that it should perform an operation for writing a symbol.

The n memories $Mem_0$ to $Mem_3$ of the bank of memories 300b moreover comprise a functionality for validating writing bitwise. Such memories are known to the person skilled in the art. They include a write validation bus of the same width as the data bus. During a write, only the bits of the data bus corresponding to validated bits on the validation bus are actually written to the memory, the other bits of the word addressed remaining unchanged. The address of the symbol, provided by the register RegId1 comprises of two parts as for the read operation described previously.

In the configuration for writing a symbol, the address calculation circuit is 140b provides the p−q high-order bits of the register RegId1, corresponding to the word address @word, to the address incrementation circuit 141. The word address @word and the incremented address are both provided to the interface 160b. The two high-order bits of the bit pointer @bit are provided to the decoder 142. The decoder 142 provides three selection signals Sel0 to Sel2 destined for the interface 160b.

The interface 160b provides the addresses @M0 to @M3 to each of the memories $Mem_0$ to $Mem_3$. The three multiplexers 161 to 163 provide an address to the memories $Mem_0$ to $Mem_2$ respectively from among the two addresses provided by the address calculation circuit 140b as a function of one of the selection signals, Sel0 to Sel2 respectively. The provision of address takes place as for the read operation.

The address calculation circuit 140b furthermore includes two subtraction circuits 143 and 144 linked to the q low-order bits of the bus 121 and to the bus 122 for receiving respectively the bit pointer @bit and the value k representative of the length of the symbol to be written. The subtraction circuits 143 and 144 also receive the value p indicating the size of word so as to calculate a shift value equal to p−k−@bit. The thus calculated shift value is positive or negative and it makes it possible to peg the symbol following the symbol previously written in the bank of memories 300b.

The address calculation circuit 140b also includes a barrel shifter 145 which receives, on the one hand, the word of p bits provided by the bus 123 and, on the other hand, the shift value calculated by the subtraction circuits 143 and 144. The barrel shifter 145 performs the calculated shift on the word to be written by looping the high order around the low order, the shift being to the left if the shift value is positive, or to the right if the shift value is negative. The shifted word is thereafter provided to the bank of memories 300b by way of the interface 160b.

The address calculation circuit 140b includes a circuit for selecting bits 146 which receives the bit pointer @bit and the value k and which provides a validation word of p bits $EN_0$ to $EN_{p-1}$ representative of the bits to be written in the bank of memories 300b which corresponds to the symbol to be written after shifting. $EN_i$ represents the $i^{th}$ lowest-order bit of the validation word, whose state indicates the validation or otherwise of the writing of the corresponding data bit. The bits $EN_i$ satisfy the following conditions:

If @bit+k≦p, then $EN_i$ validates the writing of the corresponding bit if i<p−@bit AND if p−@bit−k>i.

If @bit+k>p, then $EN_i$ validates the writing of the corresponding bit if i<p−@bit OR if (2*p)−@bit−k>i.

Preferably, these conditions are implemented in a hardwired combinatorial logic circuit so as to be able to set the validation word during the first clock cycle.

Thus an operation for writing a symbol of k bits, with k≦((n−1)×m)+1, is performed in a clock cycle. Moreover, the write operation includes the shift operation, so that the symbol written is positioned following the previous symbol written. The use of bitwise write selection moreover avoids the need to reconstitute a word of p bits before carrying out a write.

Numerous variants of the invention are possible without departing from the framework of the invention. In the preferred example described, the symbol after reading or before writing is set as low-order bits of the word of p bits. It is quite possible to perform an addressing in accordance with the invention by setting the symbol as high-order bits in the processor. It suffices to perform a bit shift in a direction opposite to that which is described.

Also, in the example described, the bit pointer @bit is numbered from the high-order end to the low-order end of the word of p bits. It is possible to adopt an inverse numbering but this entails tagging the low-order bit of the symbol instead of the high-order bit.

More generally, the position of the low-order and high-order bits is determined in an arbitrary manner, the important thing being that all the circuits correctly identify where the highest-order bit and the lowest-order bit are situated.

In the preferred example, the word address @word and the bit pointer @bit are placed in one and the same register. The choices of position of the symbol and of designation of the first bit of the symbol make it possible to have a continuous incrementation of the bit pointer @bit and of the word address @word. With such a choice, the incrementation of the word address and of the bit pointer @bit is done by adding the value k to the register containing the word address and the bit pointer @bit. Moreover the use of a single register makes it possible to dispense with one register in the bank of registers 120.

In the preferred example, various means may be modified as a function of the choices previously mentioned. Such is in particular the case for all the calculation operations performed by the subtraction circuits 143, 144, 153 and 154 as well as for the circuit for selecting bits 146.

Also, to perform the shifts of bits, the preferred embodiment uses barrel shifters. Any other circuit making it possible to perform shifts of bits can be used. It is also possible to make provision for specific means so as to be able to perform in a simultaneous manner the bit shift and mask without having a structure such as that described.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A method of addressing for performing an operation for reading or writing a symbol of k bits in a bank of memories linked to a processor by a data bus of p bits, the bank of memories being organized as words of p bits and employing word-based addressing, p being a positive integer greater than 4, and k being an integer lying between 1 and p, comprising:
   addressing a symbol with the aid of a word address designating a determined word of p bits which contains a first bit of the symbol, in combination with a bit pointer designating the first bit of the symbol in the word of p bits designated by the word address, a shift of bits being moreover performed, during the operation of reading or of writing, as a function of the value of the bit pointer, on the word of p bits read or written, such that processing time in the processor is reduced, and wherein the symbol comprises a variable length symbol corresponding to a fixed length word.

2. The method according to claim 1, wherein the bank of memories including n memories is organized as words of m bits each, m and n being two integers greater than or equal to two and such that n ×m =p so that the juxtaposition of n words of m bits originating from each of the memories forms a word of p bits, wherein, k being less than or equal to ((n−1)×m)+1, at least one of the memories of the bank is selected by the word address and at least one other memory of the bank is simultaneously selected by the word address incremented by an address unit.

3. The method according to claim 1 further comprising an operation of writing, wherein a bitwise write validation for the word of p bits to be written in the bank of memories, only the k bits corresponding to the symbol to be written after shifting are validated for the write.

4. The method according to claim 3, wherein the shift of bits comprises a shift bringing the symbol into a position contiguous with a position of another symbol in the bank of memories.

5. The method according to claim 1 further comprising an operation of reading, wherein the shift of bits brings the symbol to the low-order end or to the high-order end in the word of p bits and wherein a masking sets to zero thereafter the bits of the word of p bits not belonging to the symbol.

6. A processing device for symbols of k bits including a bank of memories and a processor linked together by at least one data bus of p bits, p being an integer greater than or equal to 4, k being an integer lying between 1 and p, the bank of memories being organized as words of p bits and employing word-based addressing, comprising:

means of storage able to store a word address and a bit pointer, said word address designating a word of p bits containing a first bit of a symbol to be read or to be written, said bit pointer designating the first bit of the symbol in the word of p bits designated by the word address, and means of shifting of bits able to perform, during an operation of reading or of writing, a shift of bits on the word of p bits read or written, as a function of the value of the bit pointer, wherein the symbol comprises a variable length symbol corresponding to a fixed length word.

7. The processing device according to claim 6, wherein the means of storage include a first register able to store the word address in the guise of high-order bits and the bit pointer in the guise of low-order bits.

8. The processing device according to claim 6, wherein the processor includes at least one second register for storing the value of k.

9. The processing device according to claims 6, wherein the bank of memories includes n memories of m bits each, n and m being two integers greater than two and such that p=n ×m, each memory being addressable individually, and wherein the processor includes:

means of address incrementation for producing an incremented address corresponding to the word address incremented by an address unit, and means of selection for selecting the word address or the incremented address to be provided as input to the bank of memories.

10. The processing device according to claim 6, wherein the processor includes means of masking for setting to zero p −k bits of a word of p bits read from the bank of memories which do not correspond to the symbol of k bits.

11. The processing device according to claim 10, wherein the processor comprises:

data inputs intended to be coupled to the data bus;

at least one data register able to receive a symbol read from the bank of memories; and an arithmetic and logic unit able to perform various operations on data present on data inputs the data inputs in response to an operation code, the arithmetic and logic unit including the means of shifting and the means of masking, and being placed on a data path between the data inputs and the data register.

12. The processing device according to claim 6, wherein the bank of memories employs a functionality for validating writing performed bitwise with the aid of a validation word of p bits, and wherein the processor includes means of generation of a word for validating writing so as to provide a validation word for validating the writing solely of the bits corresponding to the symbol to be written in the bank of memories.

13. A method of addressing for a bank of memories linked to a processor by a data bus comprising:

addressing a symbol with the aid of a word address designating a determined word which contains a first bit of the symbol, in combination with a bit pointer designating the first bit of the symbol in the word designated by the word address, a shift of bits being moreover performed as a function of the value of the bit pointer, such that processing time in the processor is reduced, and wherein the symbol comprises a variable length symbol corresponding to a fixed length word.

14. The method according to claim 13, wherein the bank of memories includes n memories organized as words of m bits each, wherein at least one of the memories of the bank is selected by the word address and at least one other memory of the bank is simultaneously selected by the word address incremented by an address unit.

15. The method according to claim 13 further comprising an operation of writing, wherein a bitwise write validation for the word to be written in the bank of memories, only bits corresponding to the symbol to be written after shifting are validated for the write.

16. The method according to claim 13, wherein the shift of bits comprises a shift bringing the symbol into a position contiguous with a position of another symbol in the bank of memories.

17. The method according to claim 13 further comprising an operation of reading, wherein the shift of bits brings the symbol to the low-order end or to the high-order end in the word of p bits and wherein a masking sets to zero thereafter the bits of the word of p bits not belonging to the symbol.

18. A processing device for a bank of memories and a processor linked together by a data bus, comprising:

memory to store a word address and a bit pointer, said word address designating a word containing a first bit of a symbol, said bit pointer designating the first bit of the symbol in the word designated by the word address; and a shifter able to perform, during an operation of reading or of writing, a shift of bits on the word, as a function of the value of the bit pointer, wherein the symbol comprises a variable length symbol corresponding to a fixed length word.

19. The processing device according to claim 18, wherein the memory includes a first register able to store the word address in the guise of high-order bits and the bit pointer in the guise of low-order bits.

20. The processing device according to claim 18, wherein the processor includes at least one second register for storing the bit value of the symbol.

* * * * *